(12) United States Patent
Cassara

(10) Patent No.: US 6,795,159 B1
(45) Date of Patent: Sep. 21, 2004

(54) MECHANISM FOR ALIGNING LENTICULAR MATERIAL AND IMAGE

(76) Inventor: Leonard J. Cassara, P.O. Box 1366, Boulder, CO (US) 80206-1366

( * ) Notice: Subject to any disclaimer, the term of this patent is extended or adjusted under 35 U.S.C. 154(b) by 44 days.

(21) Appl. No.: 10/153,235

(22) Filed: May 21, 2002

Related U.S. Application Data

(60) Provisional application No. 60/292,361, filed on May 21, 2001.

(51) Int. Cl.[7] .......................... G03B 21/32; G02B 27/22
(52) U.S. Cl. ............................. 352/87; 359/463; 353/7
(58) Field of Search .......................... 352/244, 50–52, 352/55, 57, 58, 90, 85–87; 355/22; 359/463, 619; 353/7, 10; 40/436–7, 476, 508, 509

(56) References Cited

U.S. PATENT DOCUMENTS

| | | | |
|---|---|---|---|
| 1,413,406 A | * 4/1922 | Huebner | ...................... 355/78 |
| 5,459,954 A | * 10/1995 | Bronaugh et al. | ............ 40/476 |
| 5,710,666 A | * 1/1998 | McDonald | ................... 359/463 |
| 5,815,968 A | * 10/1998 | Dehli | ........................... 40/476 |
| 5,959,718 A | 9/1999 | Morton | |
| 6,091,479 A | 7/2000 | Frosig et al. | |
| 6,280,374 B1 | 8/2001 | Manico et al. | |
| 6,384,980 B1 | * 5/2002 | McKinley | ................... 359/619 |
| 6,624,947 B2 | * 9/2003 | McKinley | ................... 359/619 |

* cited by examiner

Primary Examiner—Russell Adams
Assistant Examiner—Arthur A Smith
(74) Attorney, Agent, or Firm—Charles E. Rohrer

(57) ABSTRACT

A device for holding a print with a multi-image and for holding viewing material. An alignment mechanism engages the viewing material for translational and rotational movement relative to the print to achieve correct alignment for a three dimensional effect. The alignment mechanism is held in place so that the viewing material may be lifted from the print and replaced thereon without disturbing correct alignment to facilitate bonding the viewing material to the print.

20 Claims, 6 Drawing Sheets

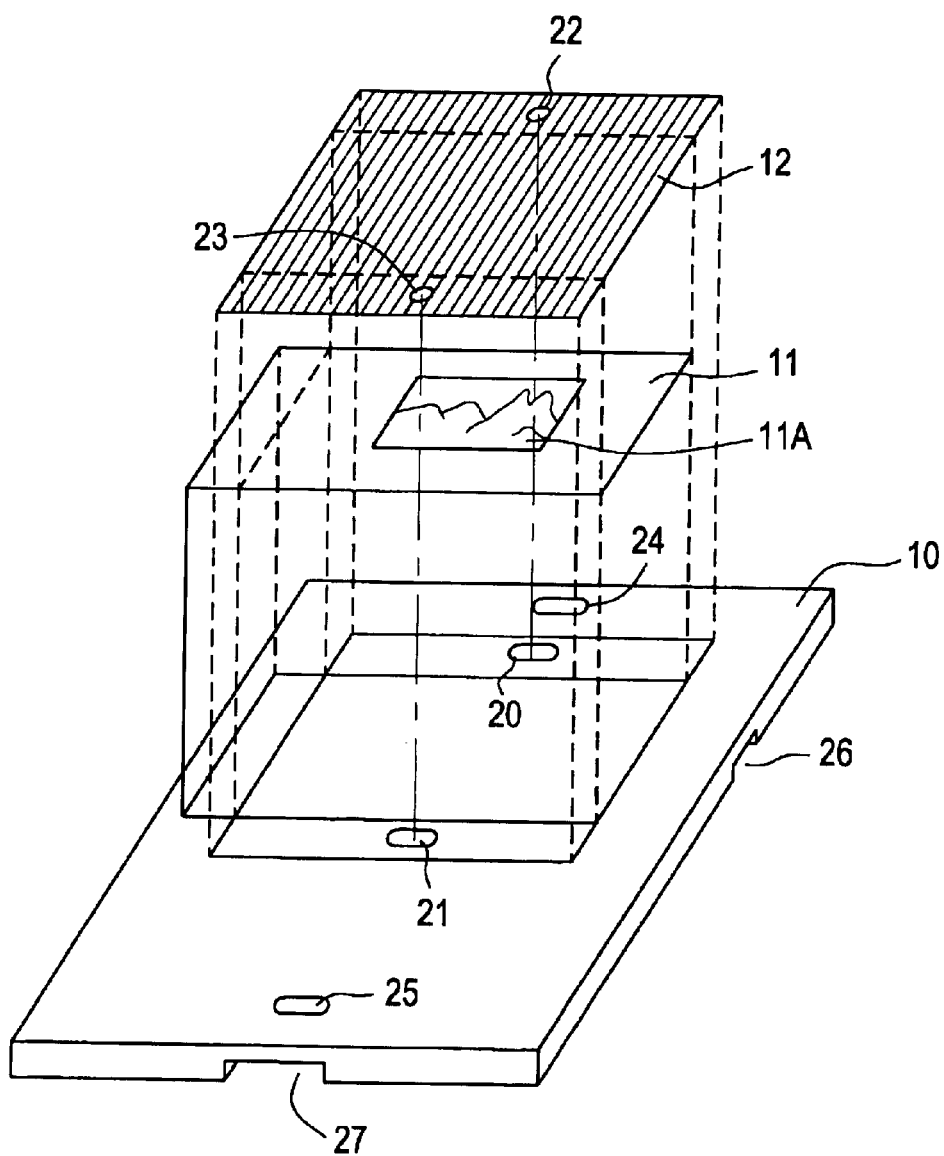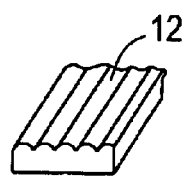

MECHANISM FOR ALIGNING LENTICULAR MATERIAL AND IMAGE

This application claims the benefit of U.S. Provisional Patent Application No. 60/292,361 filed May 21, 2001.

FIELD OF THE INVENTION

This invention relates to a mechanism used to aid in the alignment of lenticular material with an image where the image is comprised of combined exposures to create multiple perspectives for three-dimensional and animation effects.

BACKGROUND OF THE INVENTION

Photographs taken with multiple lenses produce a print on photographic image stock that contains multiple images, often referred to as multi-view or integral images. Such a print can be used with an appropriate viewing device such as lenticular material to create a three-dimensional or animation effect. Additionally, multiple exposures taken from different angles with a single lens can be combined digitally such that normally printed computer output can contain the multiple perspectives needed to produce the autostereoscopic or animation effect. Software to produce the combination of exposures is commercially available. It is necessary, however, to have precise registration of the viewing material with the image stock or with the computer produced print in order that the three-dimensional or animation effect is properly produced. Hereinafter, the words "image stock" are used to include any combination of exposures whether produced on photographic image stock or on computer print material.

SUMMARY OF THE INVENTION

The invention provides a mechanism to move viewing material relative to image stock containing an image with combined exposures in order that correct horizontal and vertical alignment of the viewing material with the image can be obtained. Once alignment is complete the invention allows removal of the viewing material so that cement can be placed on the viewing material and/or image material or so that a dry pressure sensitive adhesive material can be exposed. The invention then allows replacement of the viewing material onto the image stock with the same correct alignment that had been previously obtained so that the image stock and viewing material can be bound together thereby producing a finished product with the viewing component and the image component properly aligned for three-dimensional or animation effect.

BRIEF DESCRIPTION OF THE DRAWING

FIG. 2 is an exploded view showing the positioning of image stock and lens material on the work surface of the device of FIG. 1.

FIG. 3 shows a section of lenticular lens material.

DETAILED DESCRIPTION

The following description will refer to lenticular screen material, lenticular lens material or simply lens. It should be understood that these words are intended to include any type of appropriate viewing material that can be utilized, including lenticular, barrier strip, fly's eye, etc., used to obtain the three-dimensional and/or animation effect.

Figure 1:
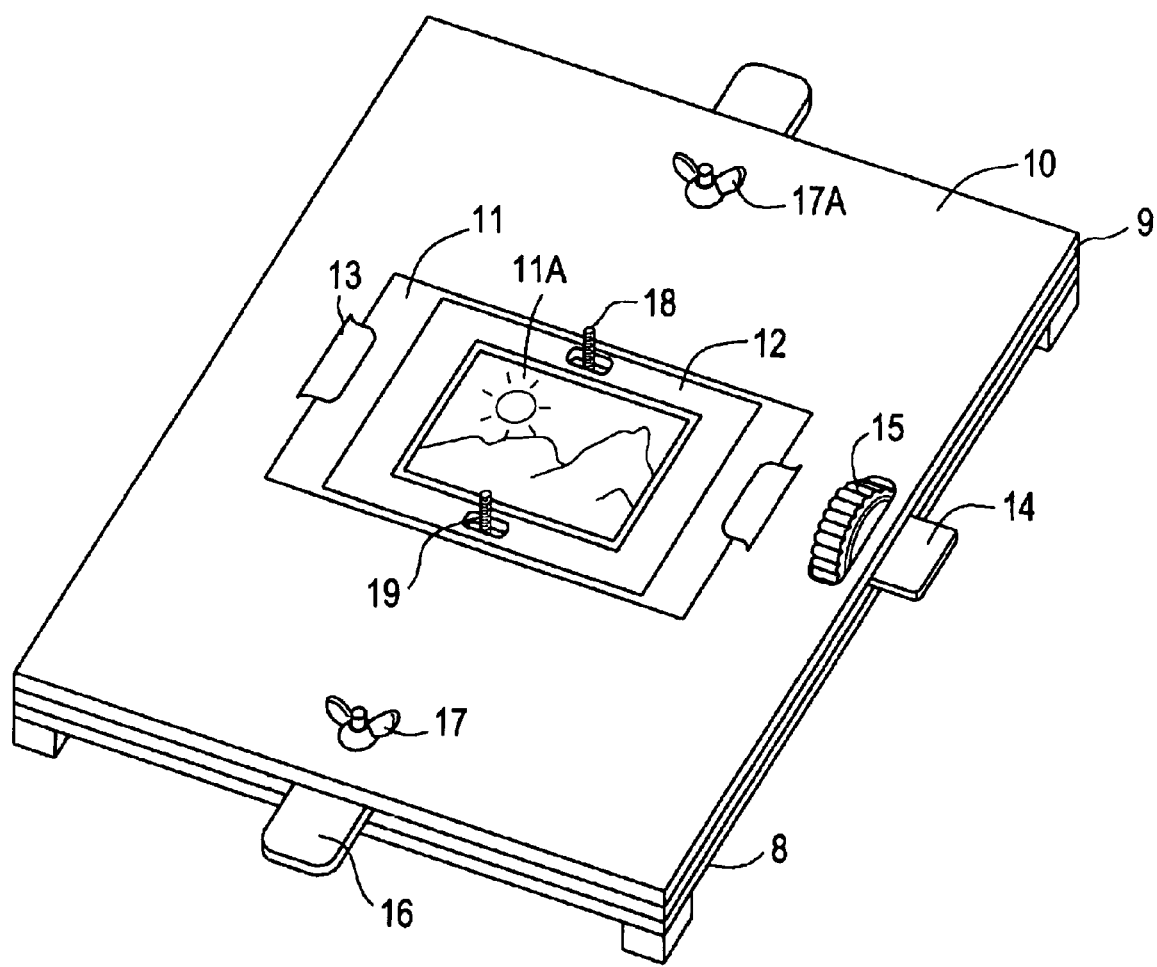
FIG. 1 is an isometric view of the assembled apparatus of the invention.

FIGS. 1–5 show a first embodiment of the invention. FIG. 1 is an isometric view of the invention with a work surface 10 upon which has been placed image stock 11 bearing the image of a mountain scene 11A. The image stock 11 is held in place in a stationary manner with a clip mechanism 13. Lenticular screen lens material 12 is placed over the image stock on the work surface 10 with holes 22 and 23 in the lens material mating with pins 18 and 19. Pins 18 and 19 are attached to lever 16 which is in turn attached to lever 14. The lens material 12 is moved horizontally by lever 14 acting through its connection to pins 18 and 19. Fine adjustment mechanism 15 is shown for precise horizontal positioning. Lens material 12 is moved into vertical alignment with the image by lever 16, acting through pins 18 and 19. The mechanism allows vertical alignment without disturbing the already obtained horizontal alignment. Once correct alignment has been achieved the horizontal and vertical alignment mechanisms are fastened in place by clamping mechanism 17 and 17A.

Lever 16 is attached to pins 18 and 19 such that when lever 16 is rotated around pivot 32, the image material 12 is also rotated through the movement of pins 18 and 19. Once appropriate vertical and horizontal alignment has been achieved, lens material 12 can be lifted up from the image stock and, if desired, completely removed from pins 18 and 19 so that cement can be applied to the back of lens material 12 and/or to the front side of image stock 11. Thereafter, replacement of lens material 12 onto pins 18 and 19 is performed in order to fasten the lens and image stock together in correct alignment.

FIG. 3 shows a section of lenticular lens material 12, but it should be noted that any appropriate viewing material can be utilized with this invention.

In using the device shown in FIG. 1, image stock 11 is placed on the work surface 10 and held fixedly in place. The lenticular screen 12 of appropriate size and orientation is placed over the image and held in place on the alignment guides of the device. The user can then adjust the alignment mechanisms so that the lenticular screen is positioned precisely with optical correctness over the image. Once the correct position is achieved, the alignment mechanism is clamped in place so the lenticular screen can be removed and reinserted as often as needed, without affecting correct optical alignment for viewing or for the application and curing of optically clear adhesive.

FIG. 2 is an exploded view showing work surface 10, image stock 11 containing an image 11A, and lens material 12. As FIG. 2 shows, image stock 11 extends beyond lenticular material 12 to engage clip 13 in a manner that keeps movement of material 12 unimpeded. Slots 20 and 21 are provided in the work surface 10 through which pins 18 and 19 can protrude from the alignment sub-assembly below the work surface. Pins 18 and 19 mate with holes 22 and 23 in the lenticular material 12 such that movement of the pins 18 and 19 results in movement of the lens material 12. Slots 24 and 25 accommodate the lock down clamps 17 and 17a shown in FIG. 1. It should be noted that slots 20, 21, 24 and 25 are designed large enough to accommodate horizontal and vertical movement of pins 18 and 19 and clamps 17 and 17A during the alignment operation. Holes 22 and 23 in lens material 12 are sized just large enough for a snug fit on pins 18 and 19.

Figure 4:
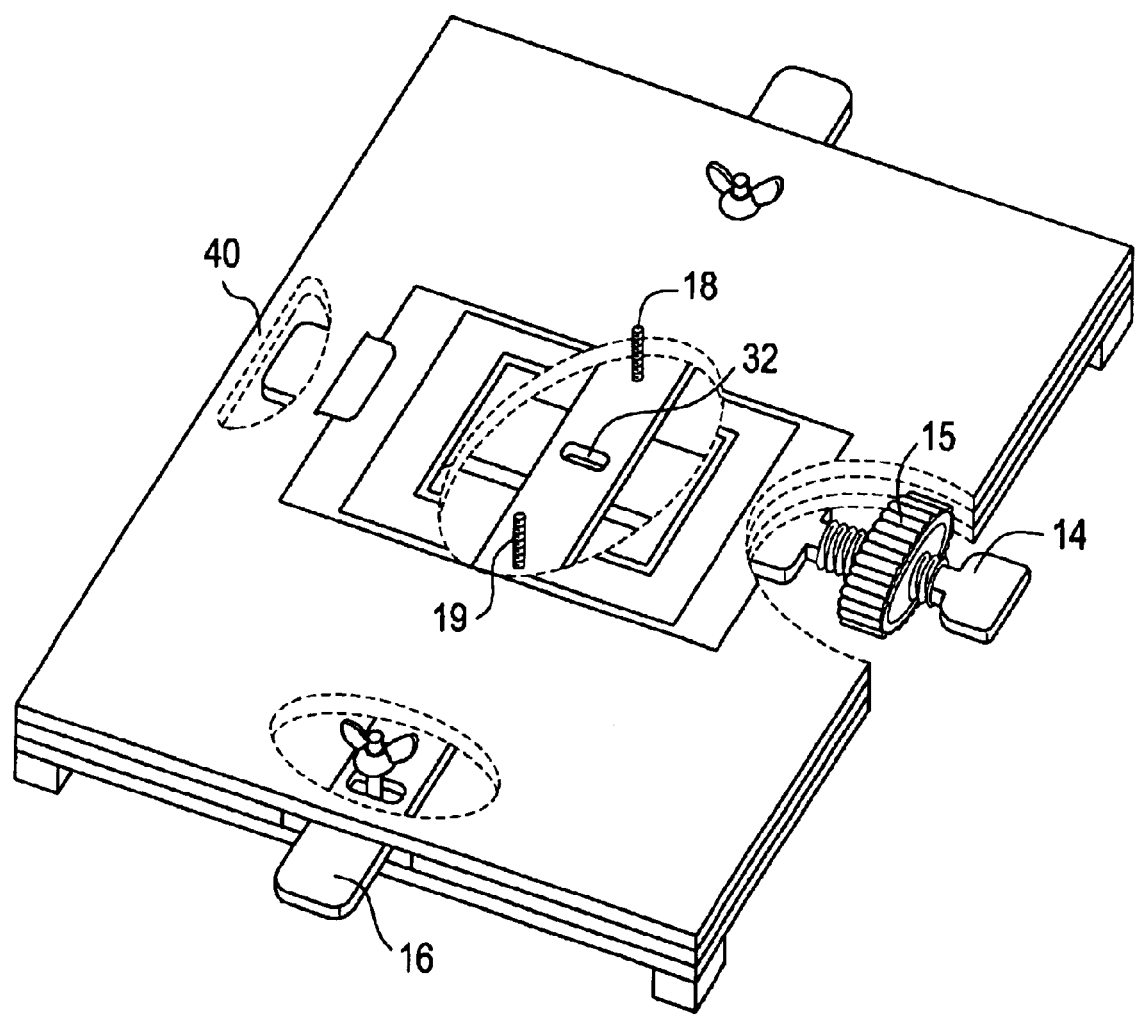
FIG. 4 is similar to FIG. 1 but with a cutaway view to show certain features of the device.
Figure 5:
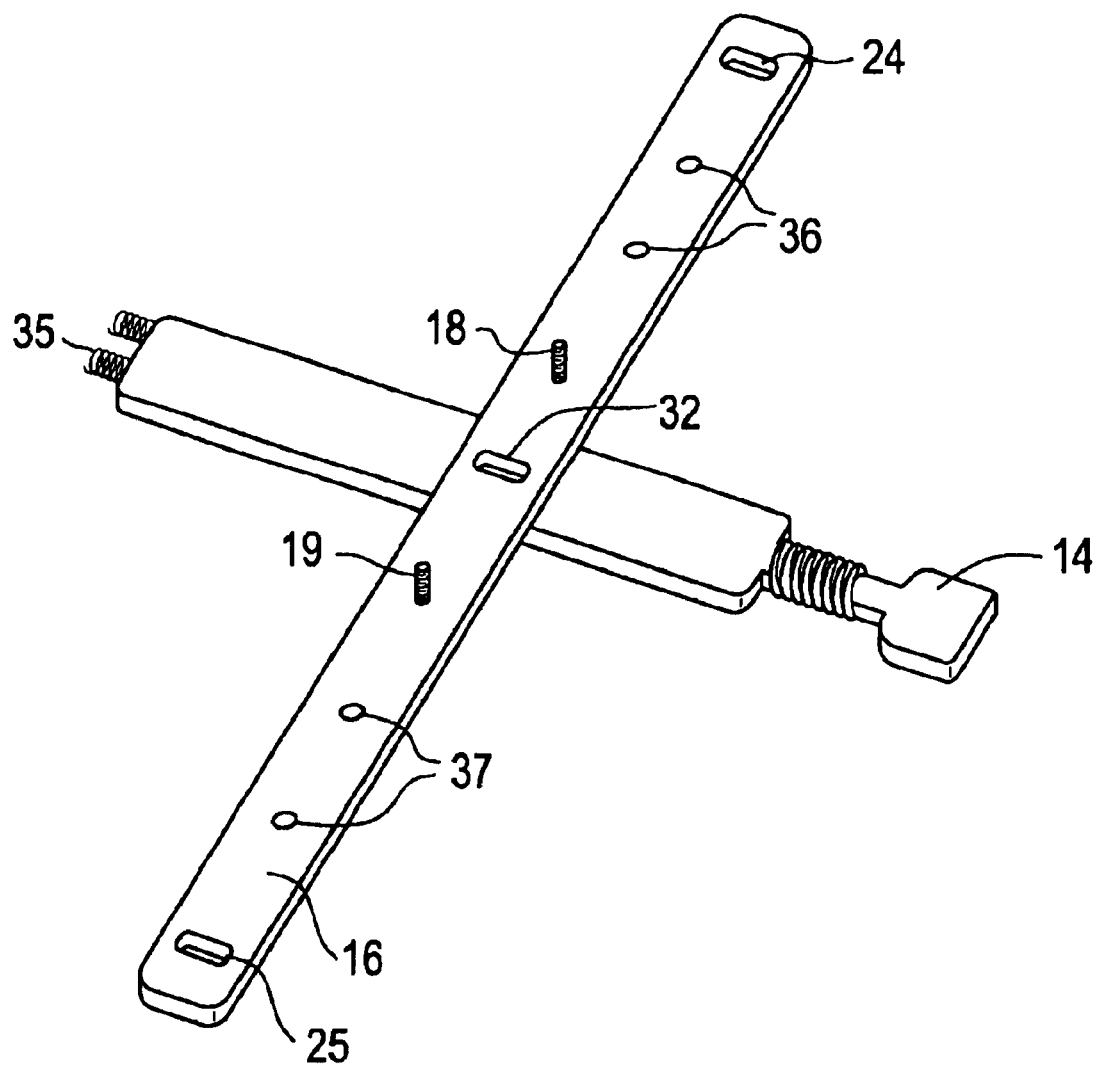
FIG. 5 shows the alignment guide sub-assembly utilized in the apparatus of FIG. 1.

The alignment guide sub-assembly is shown in FIG. 5 as comprising a horizontal alignment lever 14 and a vertical alignment lever 16 attached together at a pivot 32. Pins 18 and 19 extend upwardly from the surface of vertical alignment lever 16. Slots 24 and accommodate the clamping mechanism 17 and 17a. Resilient material depicted as a coil spring 35 is positioned between the end of the horizontal alignment lever 14 and an adjacent abutment 40, shown in FIG. 4. Any type of appropriate resilient material can be substituted for coil spring 35. Additional mounting points 36 and 37 are shown for pins 18 and 19 in order to accommodate different sizes of lens material for covering larger images.

Figure 6:
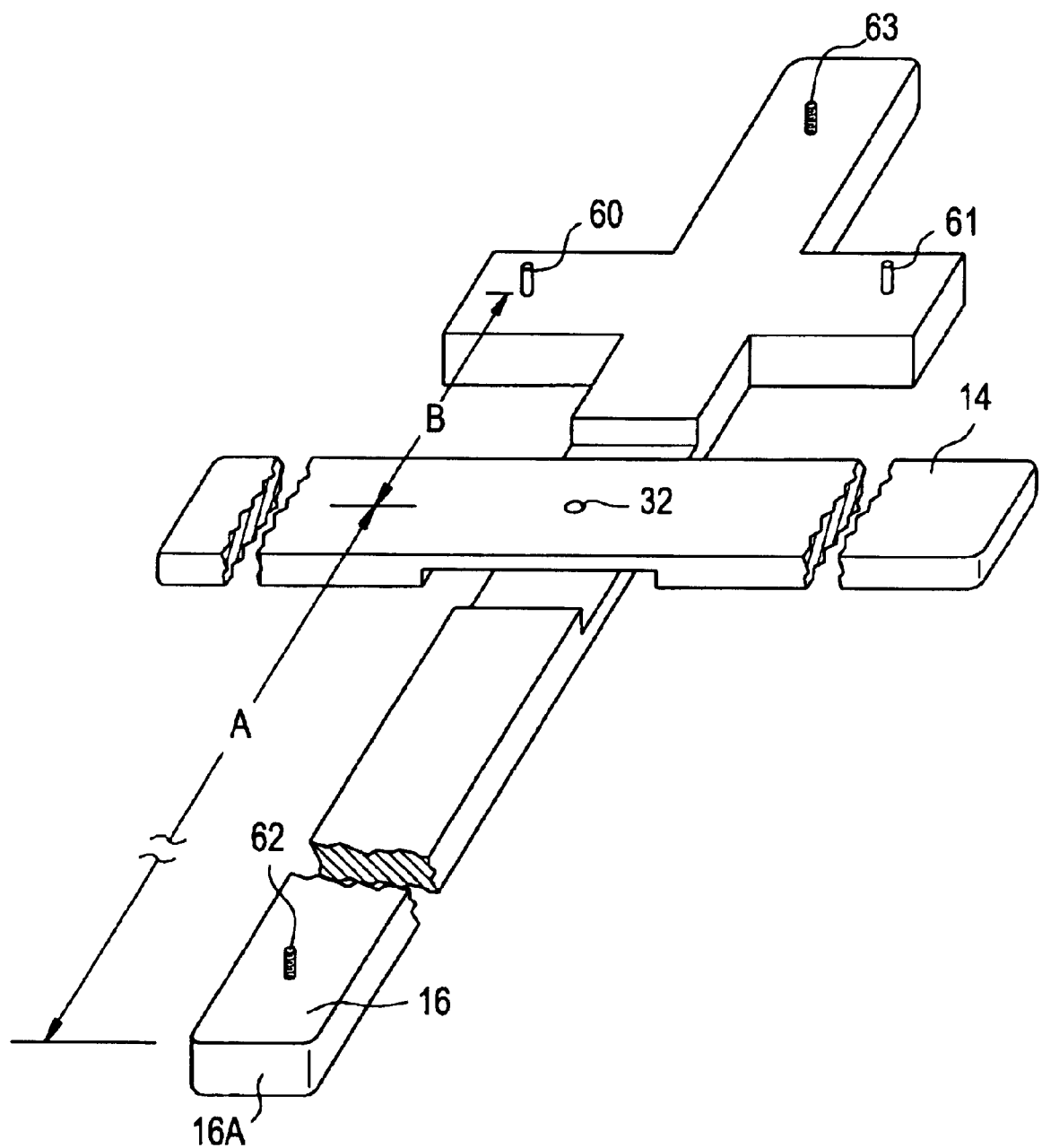
FIG. 6 shows an alternative alignment guide sub-assembly.

FIG. 6 shows an alternative arrangement for the alignment guide sub-assembly in which pins 18 and 19 are replaced by pins 60 and 61 along one side of the lens material. In that manner, different sizes of lens material may be accommodated without changing the position of the pins since the pins are positioned on only one side of the lens material. It should also be noted in this arrangement that the pins 60 and 61 are positioned at a distance B from the pivot point 32 while the vertical adjustment lever 16 extends a much greater distance A from the pivot point to its end 16A. As a consequence, manipulation of vertical adjustment lever 16 at the end 16A involves a relatively large rotational distance over a subtended angle while moving the pins a much smaller distance. While the angle of motion is identical, the radial distance through which the pins 60 and 61 move is considerably less than the radial distance through which the end 16A moves, thereby affording control over the vertical adjustment in a more precise manner. Bolts 62 and 63 are part of a hold-down clamp assembly. It should be noted, however, where compressive force between the horizontal and vertical adjustment levers at pivot point 32 is sufficient, there is no need for a hold-down clamp since the horizontal and vertical adjustment can be held without movement through the frictional force generated at pivot point 32. The horizontal fine adjustment mechanism 15 also aids in keeping the correct alignment in place once it has been obtained.

FIGS. 1 and 4 show that work surface 10 is the upper flat surface of component 9. An alignment sub-assembly such as shown in FIGS. 5 and 6 is located on the underside of component 9. A platform 8 is located below the alignment sub-assembly but is not needed if hold-down clamps 17 and 17A are utilized since the clamps can perform a second function holding the alignment sub-assembly to the underside of component 9. FIG. 2 shows grooves 26 and 27 in the underside of component 9 to accommodate the levers 14 and 16 of the alignment sub-assembly. Grooves 26 and 27 could include rails for the levers 14 and 16; in any event, grooves with or without rails are an optional feature. Brackets and other mounting arrangements are possible to hold the alignment sub-assembly on the underside of component 9.

Figure 7:
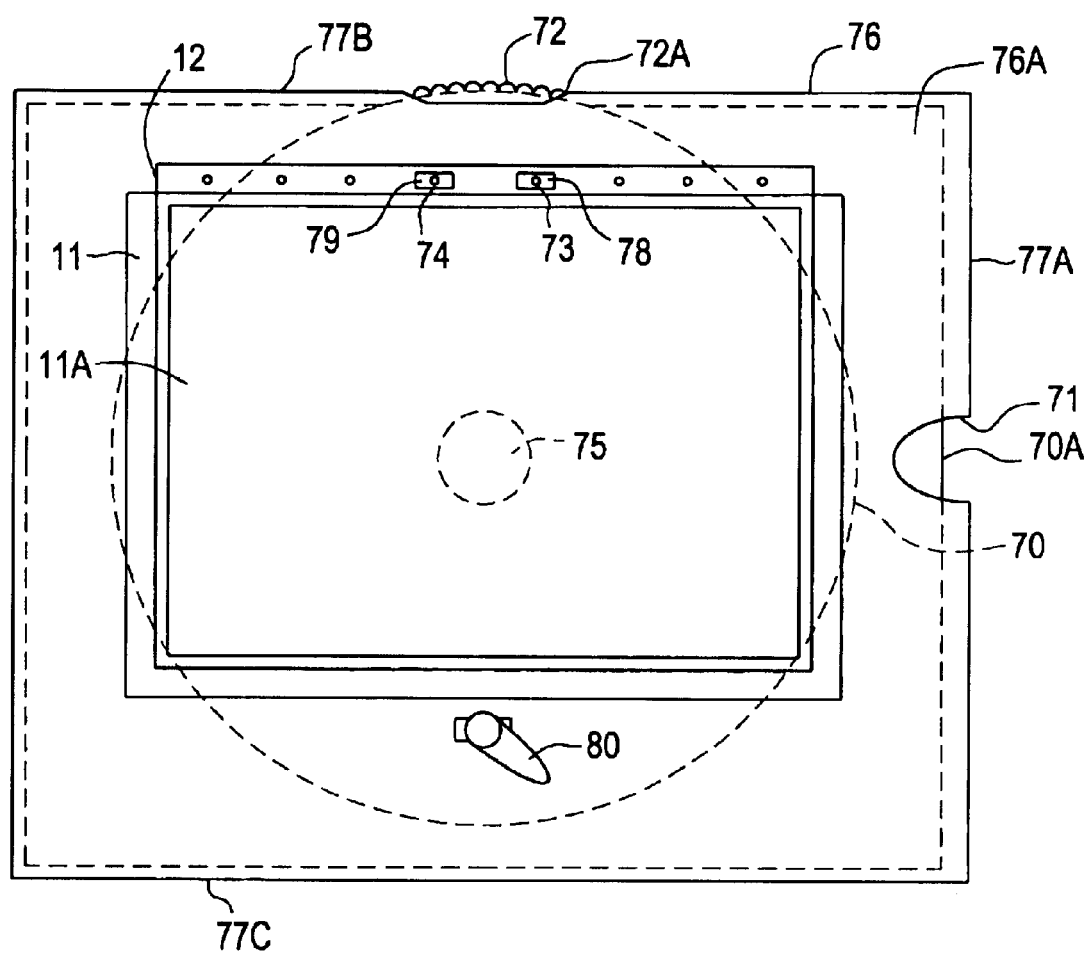
FIG. 7 shows another alternative for the inventive apparatus.

FIG. 7 shows still another embodiment of the invention where both the horizontal and vertical alignment members are comprised of disk shaped member 70. Member 70 is connected to rectangular member 70A at pivot 75 so that it can be rotated around the pivot point. The connection of members 70 and 70A is accomplished by a rivet or the like. Members 70 and 70A are moved horizontally by the user who can grip member 70A which is exposed to the user's grip at the notch 71. Member 70 is positioned vertically by the user who can grip vertical adjustment tab 72 which is part of member 70. Tab 72 is exposed at the notch 72A. Pins 73 and 74 are fastened to disk member 70A and protrude through work surface 76A. Pins 73 and 74 are fitted by the user into sprocket holes which are pre-punched along one edge of lenticular screen material 12. Vertical adjustment is made around the pivot point 75 utilizing tab 72 to rotate pins 73 and 74. Image stock 11 bearing an image 11A and lenticular material 12 are shown on the work surface 76A. A hold-down clamp 80 is also shown.

FIG. 7 shows a configuration that lends itself to low cost manufacture. The case 76 which encloses members 70 and 70A may be constructed of cardboard or plastic material with an opening along the edge 77A to form an envelope. The assembly of members 70 and 70A is inserted into the case 76 at edge 77A and positioned in the case so that pins 73 and 74 protrude through the work surface 76A which is the upper surface of case 76. Slots 78 and 79 in the work surface 76A provide an opening for pins 73 and 74 and are sized large enough to accommodate the rotational and translational movement of the pins during the alignment operation. Member 70A is sized to provide a snug fit into the envelope case 76 along edges 77B and 77C so that horizontal translational alignment can be performed and maintained in place when correct alignment is achieved. In the low cost embodiment, the case 76 is designed with a snug fit to hold the pins 73 and 74 in place after alignment without the need for hold-down clamp 80. Lenticular lens material 12 can be removed and replaced during the bonding operation as previously described without disturbing correct alignment of the lenticular material with the image.

While the invention has been shown and described with reference to preferred embodiments thereof, it should be understood that changes in the form and details of the invention may be made therein without departing from the spirit and scope of the invention. For example, member 70 is shown and described as a circular member of disk shape but it can take any convenient shape. Pins 73 and 74 may be designed large enough to grasp, thereby affording the capability of rotating member 70 by grasping one or both pins, thus avoiding need for tab 72. In FIG. 1, any type of suitable clamp may be used instead of clip mechanism 13. Work surfaces 10 and 76A can be designed with enough friction to hold image stock 11 in place without a clip mechanism or the like. A strip of frictional material fastened to the work surface is another alternative. A simple abutment ridge to locate image stock 11 may be another suitable replacement for clip 13. If desired, motorized mechanisms can be used to accomplish alignment. These changes in the details and form of the invention can be made and a myriad of other design detail changes can be made without departing from the spirit and scope of the invention; all such design details are intended to be covered by the scope of the claims set forth below.

What is claimed is:

1. Apparatus for accurately aligning lenticular lens viewing material to image stock bearing multiple integral images to obtain a three-dimensional or animation effect comprising:

a stationary work surface mounted in said apparatus for holding said image stock in a stationery manner thereon and holding said viewing material in juxtaposition with said image stock;

an aligning mechanism adjacent to said work surface capable of operatively moving said viewing material into correct alignment with the stationery image material; and a securing mechanism to hold said aligning mechanism in place operatively enabling disengagement of said viewing material from said image stock and reengaging said viewing material with said image stock without disturbing correct alignment.

2. The apparatus of claim 1 wherein said aligning mechanism includes a plurality of pins extending upwardly through said work surface at a position which does not interfere with said image stock, said pins operatively engaging said viewing material.

3. The apparatus of claim 2 wherein said aligning mechanism further includes a horizontal adjusting device for changing the position of said viewing material through translational movement of said pins to obtain horizontal alignment of said viewing material with said image.

4. The apparatus of claim 3 wherein said aligning mechanism further includes a vertical adjusting device for changing the position of said viewing material through rotation of said plurality of pins about a single pivot point to obtain vertical alignment of said viewing material with said image.

5. The apparatus of claim 4 wherein said single pivot point connects the horizontal and vertical adjusting devices together.

6. The apparatus of claim 5 wherein said horizontal adjusting device includes a first lever and the vertical adjusting device includes a second lever, said pins mounted on said second lever.

7. The apparatus of claim 6 wherein said pins are mounted on said second lever to protrude through said work surface on only one side of said image stock.

8. The apparatus of claim 7 wherein said pins are located on said second lever at a first distance from said pivot point, and the end of said second lever on the opposite side of said pivot point from said pins is a second distance from said pivot point, said second distance greater than said first distance.

9. The apparatus of claim 1 further including a hold-down mechanism for fastening said image stock in place on said work surface.

10. The apparatus of claim 1 including a frictional surface for holding said image stock on said work surface.

11. The apparatus of claim 4 wherein the horizontal and vertical adjusting devices are both included in a single flat member.

12. The apparatus of claim 11 wherein said aligning mechanism further includes a flat rectangular member, said flat single member connected to said flat rectangular member at said pivot point.

13. The apparatus of claim 12 further including an envelope style rectangular flat case wherein said aligning mechanism is inserted into said case, said flat rectangular member fitting snugly into said flat case along two opposite sides of said case while allowing translational movement for horizontal adjustment.

14. The apparatus of claim 13 wherein the top surface of said flat case is said stationary work surface, and wherein said case includes a notch exposing one side of said flat rectangular member for translational movement thereof, and wherein said case includes slots in said top surface through which said plurality of pins protrude.

15. A method of producing a product comprised of lenticular lens viewing material bonded to image stock bearing multiple integral images wherein said product provides a three-dimensional or animation effect comprising:

providing a stationary work surface for holding said image stock in a stationary manner and for holding said viewing material placed on said image stock;

providing an alignment mechanism for moving said viewing material into correct alignment with the stationary image stock for obtaining the three-dimensional or animation effect; and providing for securing said alignment mechanism in place so that said viewing material can be lifted from engagement with said image stock and replaced without disturbing said correct alignment, wherein the application of bonding material to join said viewing material to said image stock is facilitated.

16. The method of claim 15 wherein the provision of said alignment mechanism enables providing for translational and rotational movement of said viewing material.

17. The method of claim 16 further comprising providing a vertical adjustment lever and a horizontal adjustment lever connected together at a single pivot point.

18. The method of claim 15 further comprising providing a flat single member for translational and rotational movement of said viewing material, said flat single member connected to a flat rectangular member at a single pivot point.

19. The method of claim 18 further comprising providing a flat envelope type case for holding said flat rectangular member snugly on two opposite sides while allowing translational movement of the single member/rectangular member assembly.

20. The method of claim 19 further comprising providing said work surface on the top surface of said flat case; and providing a plurality of pins connected to said flat single member for protruding above said work surface, said pins providing for engagement of said alignment mechanism with said viewing material.

* * * * *